US006995824B2

(12) United States Patent
Joten (10) Patent No.: US 6,995,824 B2
(45) Date of Patent: Feb. 7, 2006

(54) LIQUID CRYSTAL DISPLAY DEVICE

(75) Inventor: Kazuhiro Joten, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 10/995,495

(22) Filed: Nov. 24, 2004

(65) Prior Publication Data

US 2005/0073635 A1    Apr. 7, 2005

Related U.S. Application Data

(63) Continuation of application No. PCT/JP04/02167, filed on Feb. 25, 2004.

(30) Foreign Application Priority Data

Feb. 25, 2003   (JP)   ............... 2003-048056

(51) Int. Cl.
*G02F 1/1335*   (2006.01)
*G02F 1/13*   (2006.01)

(52) U.S. Cl. .................. 349/119; 349/117; 349/96; 349/179; 349/186

(58) Field of Classification Search ................ 349/117, 349/96, 119, 179, 186
See application file for complete search history.

(56) References Cited

U.S. PATENT DOCUMENTS 5,119,220 A * 6/1992 Narita et al. ................. 349/121
6,801,283 B2 * 10/2004 Koyama et al. ............. 349/119
2005/0105016 A1 * 5/2005 Kurihara et al. .............. 349/96

FOREIGN PATENT DOCUMENTS

| JP | 01-270024 | 10/1989 |
| JP | 8-122755US | 5/1996 |
| JP | 2002-107733 | 4/2002 |

OTHER PUBLICATIONS

U.S. Appl. No. 10/934,433, filed Sep. 7, 2004, Joten.
U.S. Appl. No. 10/986,382, filed Nov. 12, 2004, Joten.
U.S. Appl. No. 10/995,323, filed Nov. 24, 2004, Joten.
U.S. Appl. No. 10/995,495, filed Nov. 24, 2004, Joten.

* cited by examiner

*Primary Examiner*—Huyen Ngo
(74) *Attorney, Agent, or Firm*—Oblon, Spivak, McClelland, Maier & Neustadt, P.C.

(57) ABSTRACT

A liquid crystal display device includes a liquid crystal panel, a polarizer plate that is disposed on an observer side, relative to the liquid crystal panel, a polarizer plate that is disposed to be opposed to the polarizer plate, with the liquid crystal panel interposed, and an optical film that is disposed between the polarizer plate and the liquid crystal panel and between the polarizer plate and the liquid crystal panel, thereby to increase a viewing angle of an image that is displayed by the liquid crystal panel, wherein a twist angle of the liquid crystal molecules sealed in the liquid crystal panel is greater than 90° and not greater than 96°, a retardation Δnd of the liquid crystal panel is between 400 nanometers (nm) and 430 nm, and a retardation Δnd of the optical film is between 110 nm and 120 nm.

5 Claims, 8 Drawing Sheets

LIQUID CRYSTAL DISPLAY DEVICE

CROSS-REFERENCE TO RELATED APPLICATIONS

This is a Continuation Application of PCT Application No. PCT/JP2004/002167, filed Feb. 25, 2004, which was published under PCT Article 21(2) in Japanese.

This application is based upon and claims the benefit of priority from prior Japanese Patent Application No. 2003-048056, filed Feb. 25, 2003, the entire contents of which are incorporated herein by reference.

BACKGROUND OF THE INVENTION

1. Field of the Invention

The present invention relates to a liquid crystal display device including an optical film for increasing a viewing angle of an image that is displayed on a liquid crystal panel.

2. Description of the Related Art

There has been a strong demand for an improvement of, in particular, vertical viewing angle characteristics of a liquid crystal display device that is provided on a mobile phone.

With a WV film that is usually used in a personal computer monitor, a vertical viewing angle cannot be increased. In order to increase the vertical viewing angle, Jpn. Pat. Appln. KOKAI Publication No. 8-122755 proposes a liquid crystal display device that includes an NH film that can compensate birefringence in a wide wavelength region.

In the liquid crystal display device with the NH film, the vertical viewing angle can be improved. However, such a problem arises that vertical and horizontal viewing angle distributions vary due to matching of optical constants (e.g. $\Delta$nd, $\omega$,) of the panel and retardation values of the NH film.

The object of the present invention is to provide a liquid crystal display device with good display characteristics relating to vertical and horizontal viewing angles, which are obtained by optimizing the matching of retardation values of optical films.

BRIEF SUMMARY OF THE INVENTION

According to the present invention, there is provided a liquid crystal display device a liquid crystal display device comprising: a liquid crystal panel that is configured such that liquid crystal molecules are sealed between two glasses; a first polarizer plate that is disposed on an observer side, relative to the liquid crystal panel; a second polarizer plate that is disposed to be opposed the first polarizer plate, with the liquid crystal panel interposed; and an optical film that is disposed at least between the first polarizer plate and the liquid crystal panel or between the second polarizer plate and the liquid crystal panel, thereby to increase a viewing angle of an image that is displayed by the liquid crystal panel, wherein a twist angle of the liquid crystal molecules sealed in the liquid crystal panel is greater than 90° and not greater than 96°, a retardation $\Delta$nd of the liquid crystal panel is between 400 nanometers (nm) and 430 nm, and a retardation $\Delta$nd of the optical film is between 110 nm and 120 nm.

According to the present invention, there is provided a mobile communication apparatus comprising a main body and a display unit that is provided on the main body,. thereby to display information, wherein the display unit includes the liquid crystal display device according to the invention.

DETAILED DESCRIPTION OF THE INVENTION

A liquid crystal display device according to an embodiment of the invention includes an optical film that is disposed at least between a first polarizer plate and a liquid crystal panel or between a second polarizer plate and the liquid crystal panel, thereby to increase a viewing angle of an image that is displayed by the liquid crystal panel. A twist angle of liquid crystal molecules sealed in the liquid crystal panel is greater than 90° and not greater than 96°, and a retardation $\Delta$nd of the liquid crystal panel is between 400 nanometers (nm) and 430 nm. A retardation $\Delta$nd of the optical film is between 110 nm and 120 nm. Therefore, a vertical viewing angle can be increased, and a variation in hue in a horizontal viewing-angle direction can remarkably be improved. As a result, a transmissive TFT liquid crystal display device with good characteristics can be provided.

In this embodiment, when the viewing angle is defined as an angle range of a region with a contrast of 10 or more, it is preferable that the ratio of a vertical viewing angle to a horizontal viewing angle be 1.25 or more.

Preferably, the optical film should be disposed between the first polarizer plate and the liquid crystal panel and between the second polarizer plate and the liquid crystal panel.

Preferably, the liquid crystal display device should further include a backlight supply unit that is provided on that side of the second polarizer plate, which is opposed to the liquid crystal panel, thereby to supply backlight to the liquid crystal molecules sealed in the liquid crystal panel.

An embodiment of the present invention will now be described with reference to the accompanying drawings.

Figure 1:
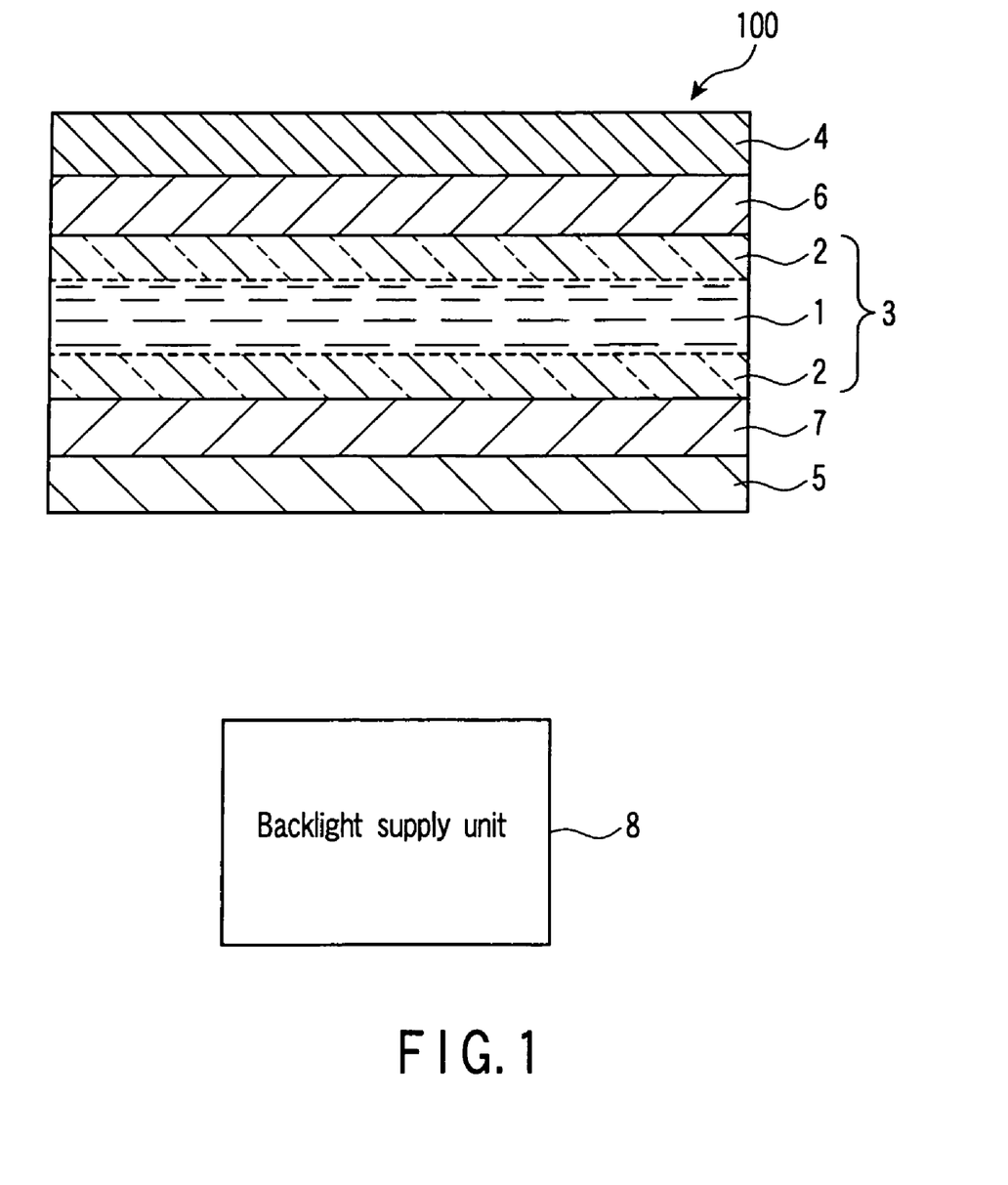
FIG. 1 is a cross-sectional view that shows the structure of a liquid crystal display device according to an embodiment of the present invention.
Figure 2:
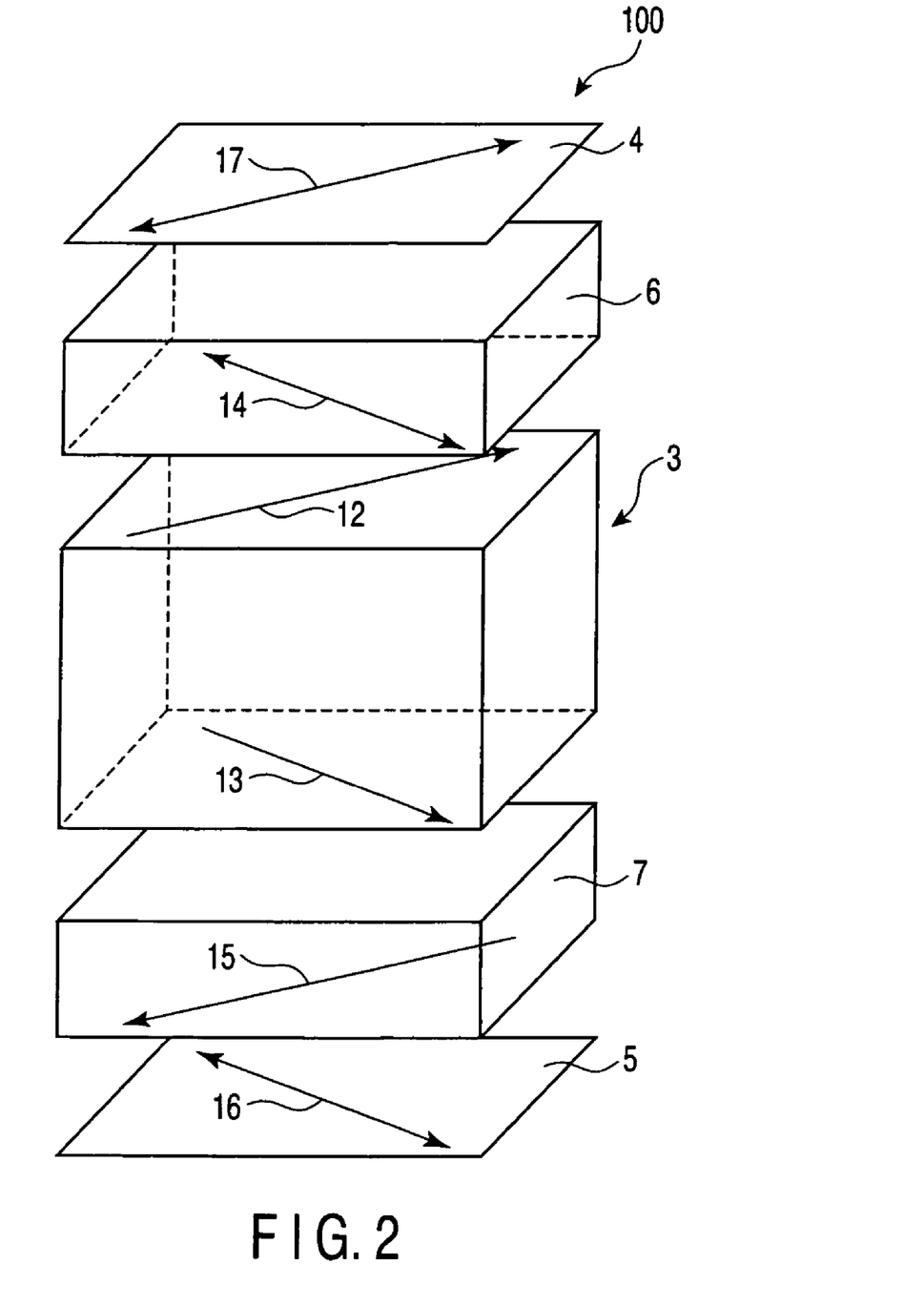
FIG. 2 is a schematic perspective view for explaining the structure of the liquid crystal display device according to the embodiment.
Figure 3:
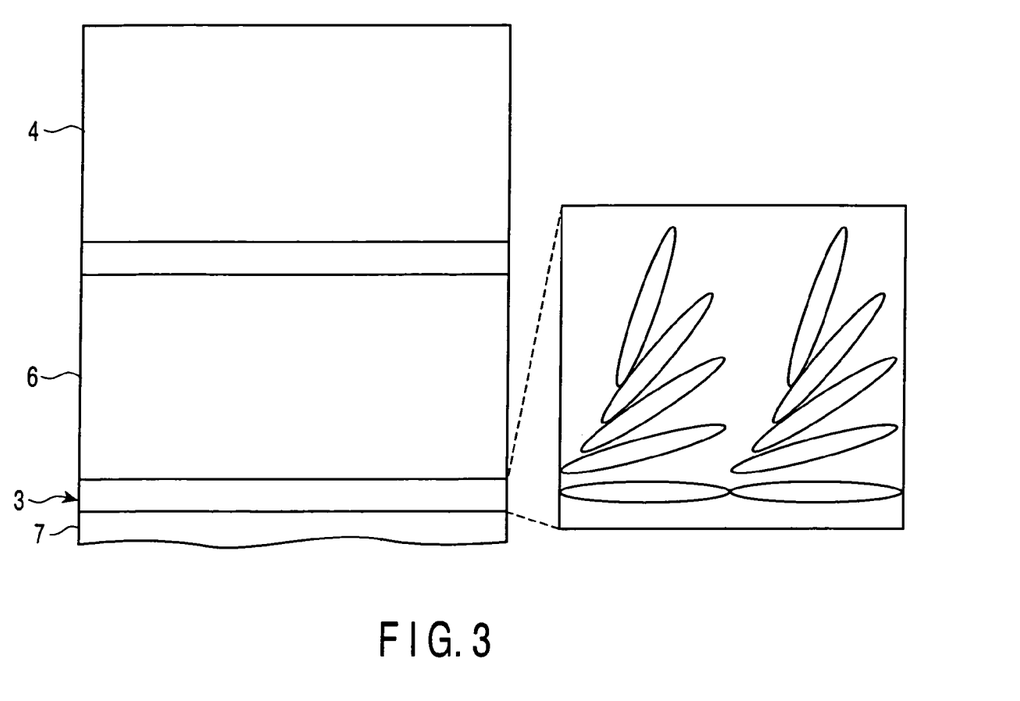
FIG. 3 is a schematic diagram for explaining the structures of a polarizer plate and an optical film, which are provided in the liquid crystal display device according to the embodiment.
Figure 4:
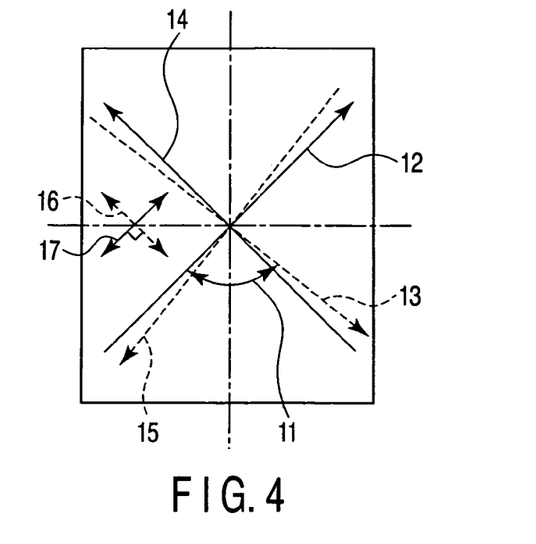
FIG. 4 is a plan view for describing the structures of the polarizer plate and optical film, which are provided in the liquid crystal display device according to the embodiment.

FIG. 1 is a cross-sectional view that shows the structure of a transmissive TFT liquid crystal display device 100 according to the embodiment. FIG. 2 is a schematic perspective view for explaining the structure of the transmissive TFT liquid crystal display device 100. FIG. 3 is a schematic diagram for explaining the structures of a polarizer plate and an optical film, which are provided in the transmissive TFT liquid crystal display device 100. FIG. 4 is a plan view for describing the structures of the polarizer plate and optical film, which are provided in the transmissive TFT liquid crystal display device 100.

The transmissive TFT liquid crystal display device 100 includes a liquid crystal panel 3. The liquid crystal panel 3 is configured such that two glass plates 2 are disposed to face each other, and liquid crystal molecules 1 are sealed between the two glass plates 2.

The twist angle of the liquid crystal molecules 1 is greater than 90° and not greater than 96°. The retardation Δnd of the liquid crystal panel 3 is between 400 nanometers (nm) and 430 nm.

The transmissive TFT liquid crystal display device 100 includes a polarizer plate 4. The polarizer plate 4 is disposed on an observer side, relative to the liquid crystal panel 3.

The transmissive TFT liquid crystal display device 100 includes a polarizer plate 5 that is disposed to be opposed the polarizer plate 4, with the liquid crystal panel 3 interposed.

The transmissive TFT liquid crystal display device 100 includes an optical film 6. The optical film 6 is formed of an NH film and is disposed between the polarizer plate 4 and liquid crystal panel 3 in order to increase a vertical viewing angle of an image that is displayed by the liquid crystal panel 3.

The transmissive TFT liquid crystal display device 100 includes an optical film 7. The optical film 7 is formed of an NH film and is disposed between the polarizer plate 5 and liquid crystal panel 3 in order to increase a vertical viewing angle of an image that is displayed by the liquid crystal panel 3. The retardation Δnd of the optical film 6 and optical film 7 is between 110 nm and 120 nm.

It is particularly preferable that a liquid crystal molecule twist angle 11 between a rubbing direction 12 of the liquid crystal molecules 1 on the polarizer plate 4 side and a rubbing direction 13 of the liquid crystal molecules 1 on the polarizer plate 5 side be set between 94° and 96°. An absorption axis 17 of the polarizer plate 4 and an absorption axis 16 of the polarizer plate 5 are substantially perpendicular to each other. An absorption axis 14 of the optical film 6 and an absorption axis 15 of the optical film 7 are substantially perpendicular to each other.

The optical films 6 and 7 are attached to the glass plates 2 of the liquid crystal panel 3 by means of an adhesive. The polarizer plate 4 is attached to the optical film 6 by an adhesive. The polarizer plate 5 is attached to the optical film 7 by an adhesive.

The transmissive TFT liquid crystal display device 100 includes a backlight supply unit 8. The backlight supply unit 8 is provided on that side of the polarizer plate 5, which is opposed to the liquid crystal panel 3, thereby to supply backlight to the liquid crystal molecules 1 sealed in the liquid crystal panel 3.

In the transmissive TFT liquid crystal display device 100, if the viewing angle is defined as an angle range of a region with a contrast of 10 or more, the ratio of the vertical viewing angle to the horizontal viewing angle is 1.25 or more.

In the transmissive TFT liquid crystal display device 100 with the above-described structure, if the backlight supply unit 8 emits backlight to the polarizer plate 5, the backlight from the backlight supply unit 8 passes through the polarizer plate 5 and optical film 7 and enters the liquid crystal panel 3. The backlight that enters the liquid crystal panel 3 passes through one glass plate 2, liquid crystal molecules 1 and the other glass plate 2 of the liquid crystal panel 3, and then through the optical film 6 and polarizer plate 4. Thus, the backlight goes out toward the observer.

Figure 5:
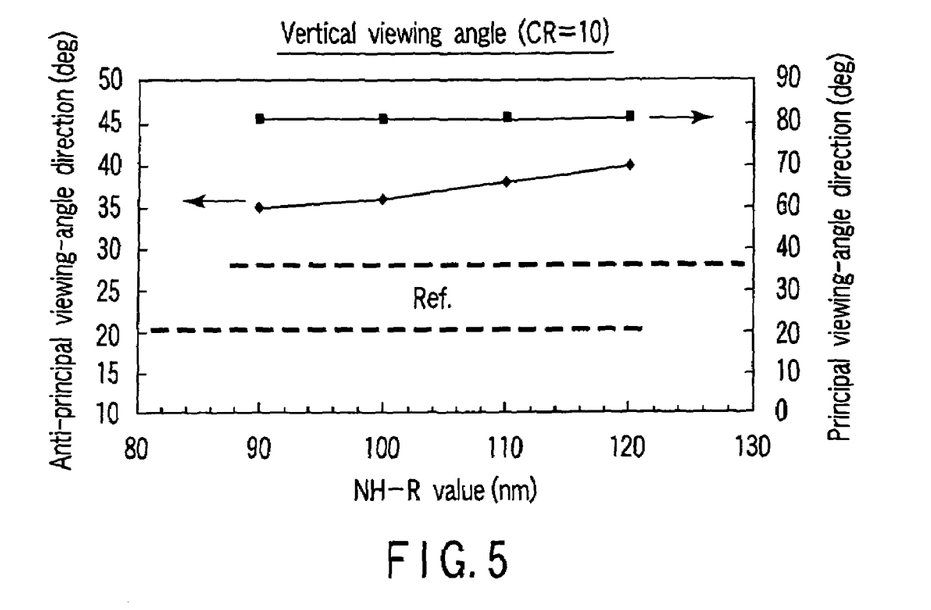
FIG. 5 is a graph showing a relationship between a vertical viewing angle and an NH-R value in the liquid crystal display device according to the embodiment.

FIG. 5 is a graph showing a relationship between a vertical viewing angle and an NH-R value in the transmissive TFT liquid crystal display device 100 according to the embodiment. The retardation Δnd of the liquid crystal panel 3 provided in the transmissive TFT liquid crystal display device 100 is about 420 nanometers (nm). As has been described above, the optical film 6 and optical film 7 are provided. Hence, the vertical viewing angle in the principal viewing-angle direction and the vertical viewing angle in the anti-principal viewing-angle direction are greater than those in the prior art wherein no such optical films are provided.

Figure 6:
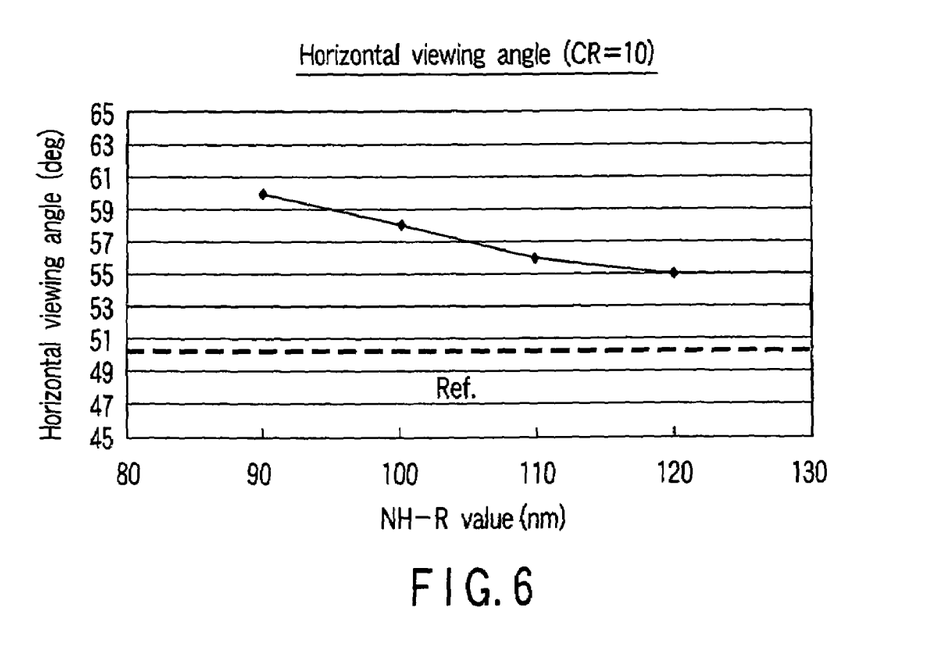
FIG. 6 is a graph showing a relationship between a horizontal viewing angle and an NH-R value in the liquid crystal display device according to the embodiment.

FIG. 6 is a graph showing a relationship between a horizontal viewing angle and an NH-R value in the transmissive TFT liquid crystal display device 100 according to the embodiment. The retardation Δnd of the liquid crystal panel 3 is about 420 nanometers (nm). As has been described above, the twist angle of liquid crystal molecules 1 sealed in the liquid crystal panel 3 is greater than 90° and not greater than 96°, and the retardation Δnd of the liquid crystal panel 3 is between 400 nanometers (nm) and 430 nm. Hence, the horizontal viewing angle is greater than that in the prior art, which is indicated by a broken line.

Figure 7:
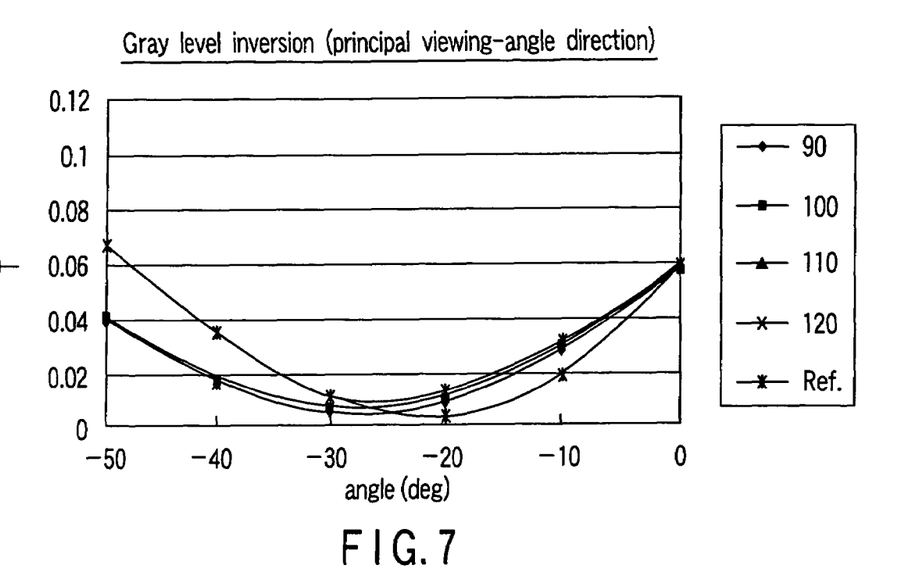
FIG. 7 is a graph showing a relationship between a principal viewing-angle direction and a gray scale in the liquid crystal display device according to the embodiment.

FIG. 7 is a graph showing a relationship between a principal viewing-angle direction and a gray scale in the transmissive TFT liquid crystal display device 100. The retardation Δnd of the liquid crystal panel 3 is about 420 nanometers (nm). As is shown in FIG. 7, in the transmissive TFT liquid crystal display device 100, a variation in gray levels in the principal viewing-angle direction is less than in the prior art.

Figure 8:
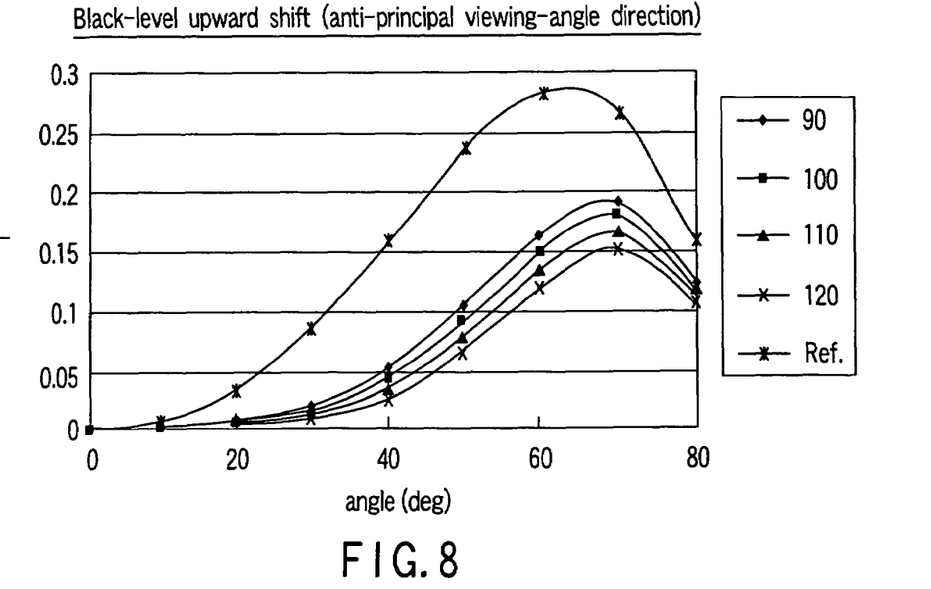
FIG. 8 is a graph showing a relationship between a anti-principal viewing-angle direction and a gray scale in the liquid crystal display device according to the embodiment.

FIG. 8 is a graph showing a relationship between an anti-principal viewing-angle direction and a gray scale in the transmissive TFT liquid crystal display device 100. The retardation Δnd of the liquid crystal panel 3 is about 420 nanometers (nm). As is shown in FIG. 8, in the transmissive TFT liquid crystal display device 100, a degree of upward shift of transmittance of black in the anti-principal viewing-angle direction is less than in the prior art.

Figure 9:
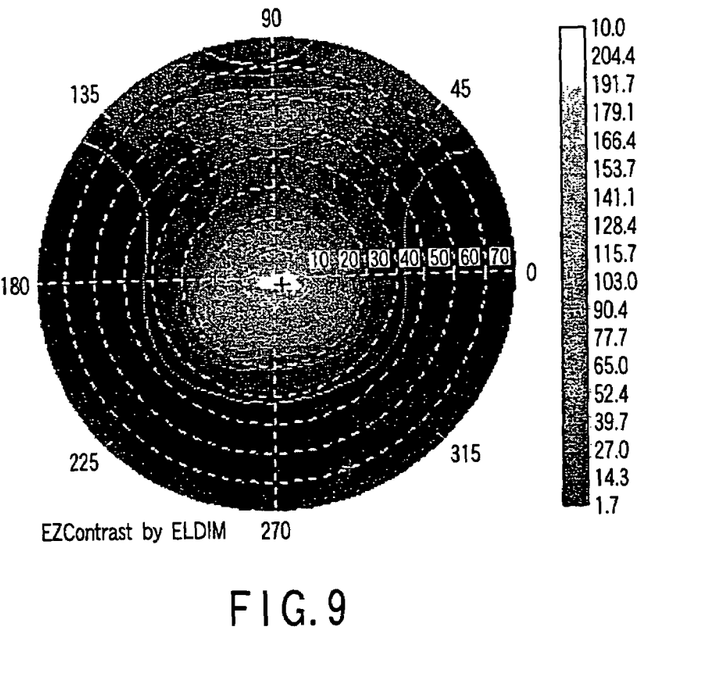
FIG. 9 is a graph showing a viewing angle in the liquid crystal display device according to the embodiment.
Figure 10:
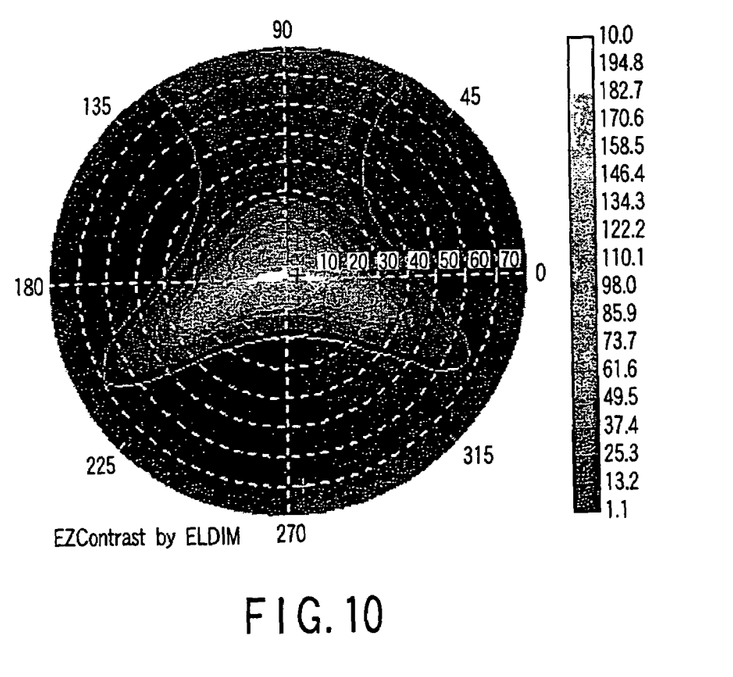
FIG. 10 is a graph showing a viewing angle in a prior-art liquid crystal display device.

FIG. 9 is a graph showing a viewing angle with a 12 o'clock principal viewing angle in the transmissive TFT liquid crystal display device 100 according to the embodiment. FIG. 10 is a graph showing a viewing angle with a 12 o'clock principal viewing angle in the prior-art transmissive TFT liquid crystal display device. As is shown in FIG. 9 and FIG. 10, the viewing angle with the 12 o'clock principal viewing angle in the transmissive TFT liquid crystal display device 100 is greater than that in the prior-art transmissive TFT liquid crystal display device.

Figure 11:
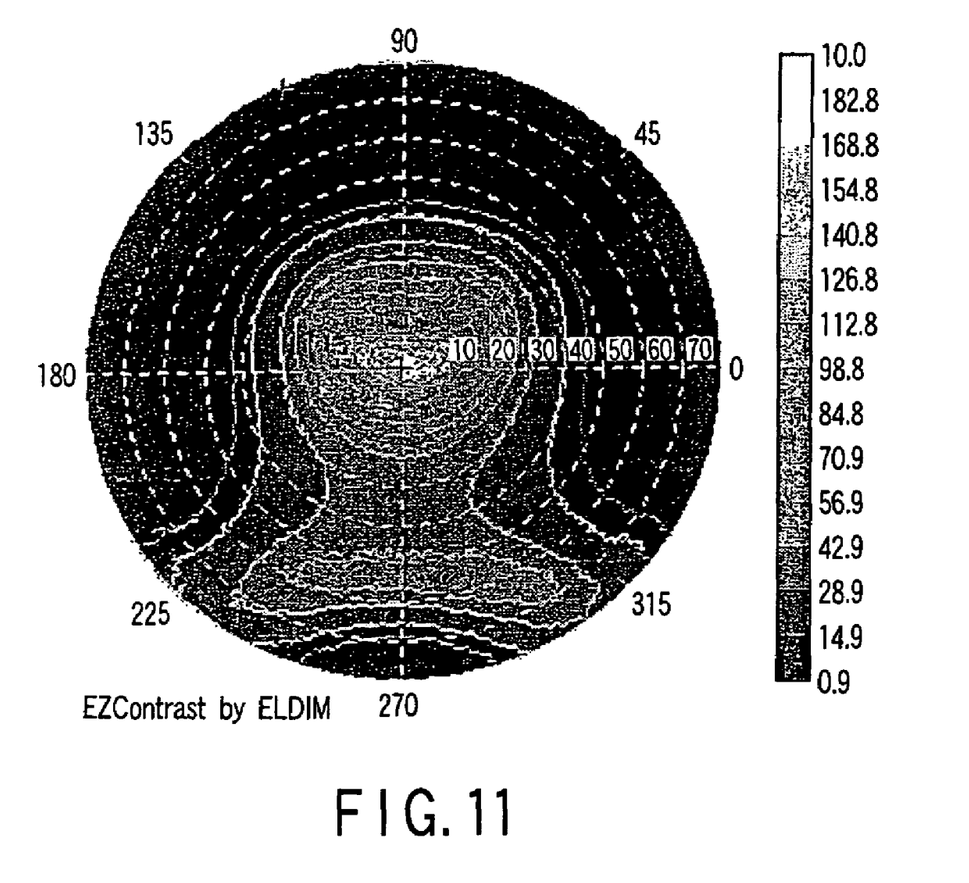
FIG. 11 is a graph showing a viewing angle in another liquid crystal display device according the embodiment.

FIG. 11 is a graph showing a viewing angle with a 6 o'clock principal viewing angle in another transmissive TFT liquid crystal display device according to the embodiment. In this transmissive TFT liquid crystal display device, only one optical film is provided. That is, only the optical film 6 is provided, and the optical film 7 is not provided.

When the viewing angle of the transmissive TFT liquid crystal display device 100 with the two NH films, as shown in FIG. 9, is compared to the viewing angle of the transmissive TFT liquid crystal display device with the single NH film, as shown in FIG. 11, their principal viewing angle directions of liquid crystal cells are different from each other, that is, the 12 o'clock direction and 6 o'clock direction, respectively. Consequently, the distribution profiles of the viewing angles are reversed. However, the degrees of the increase in the viewing angles, relative to the prior-art transmissive TFT liquid crystal display device, are substantially equal. If at least one NH film is provided, the viewing angle can be increased, compared to the prior art.

In this example, only one optical film is provided, that is, only the optical film 6 is provided and the optical film 7 is not provided. Alternatively, the optical film 6 may not be provided and the optical film 7 may be provided.

As has been described above, according to the present embodiment, the optical film 6, 7 is disposed at least between the polarizer plate 4 and the liquid crystal panel 3 or between the polarizer plate 5 and the liquid crystal panel 3, thereby to increase the viewing angle of an image that is displayed by the liquid crystal panel 3. The twist angle of the liquid crystal molecules 1 sealed in the liquid crystal panel 3 is greater than 90° and not greater than 96°, and the retardation Δnd of the liquid crystal panel 3 is between 400 nanometers (nm) and 430 nm. The retardation Δnd of the optical film is between 110 nm and 120 nm. Therefore, the vertical viewing angle can be increased, and at the same time the variation in hue in the horizontal viewing-angle direction can remarkably be improved. As a result, a transmissive TFT liquid crystal display device with good display characteristics can be provided.

Figure 12:
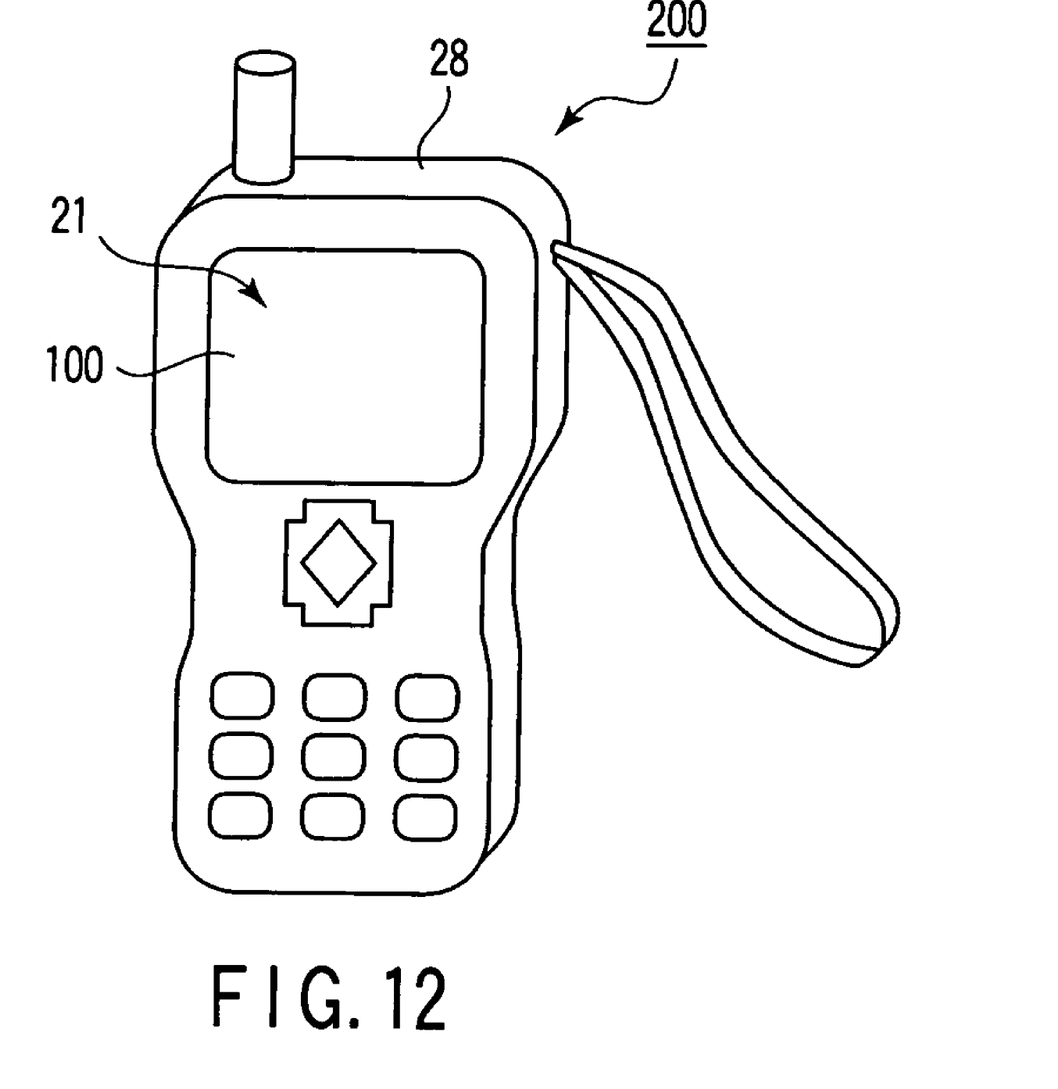
FIG. 12 is a perspective view that shows an external appearance of a mobile communication apparatus that includes the liquid crystal display device according to the embodiment.

FIG. 12 is a perspective view that shows an external appearance of a mobile communication apparatus 200 that includes the transmissive TFT liquid crystal display device 100 according to the embodiment. The transmissive TFT liquid crystal display device 100 according to the embodiment can increase the vertical viewing angle. Therefore, the transmissive TFT liquid crystal display device 100 can suitably be applied to a display unit 21 of the mobile communication apparatus 200, which comprises a main body 28 and the display unit 21 that is provided on the main body 28 in order to display information.

As has been described above, the present invention can provide a liquid crystal display device with good display characteristics, wherein a vertical viewing angle can be increased and a variation in hue in a horizontal viewing-angle direction can remarkably be improved.

What is claimed is:

1. A liquid crystal display device comprising:
   a liquid crystal panel that is configured such that liquid crystal molecules are sealed between two glasses;
   a first polarizer plate that is disposed on an observer side, relative to the liquid crystal panel;
   a second polarizer plate that is disposed to be opposed the first polarizer plate, with the liquid crystal panel interposed; and
   an optical film that is disposed at least between the first polarizer plate and the liquid crystal panel or between the second polarizer plate and the liquid crystal panel, thereby to increase a viewing angle of an image that is displayed by the liquid crystal panel,
   wherein a twist angle of the liquid crystal molecules sealed in the liquid crystal panel is greater than 90° and not greater than 96°,
   a retardation Δnd of the liquid crystal panel is between 400 nanometers (nm) and 430 nm, and
   a retardation Δnd of the optical film is between 110 nm and 120 nm.

2. The liquid crystal display device according to claim 1, wherein a ratio of a vertical viewing angle to a horizontal viewing angle is 1.25 or more.

3. The liquid crystal display device according to claim 1, wherein the optical film is disposed between the first polarizer plate and the liquid crystal panel and between the second polarizer plate and the liquid crystal panel.

4. The liquid crystal display device according to claim 1, further comprising a backlight supply unit that is provided on that side of the second polarizer plate, which is opposed to the liquid crystal panel, thereby to supply backlight to the liquid crystal molecules sealed in the liquid crystal panel.

5. A mobile communication apparatus comprising:
   a main body; and
   a display unit that is provided on the main body, thereby to display information,
   wherein the display unit includes the liquid crystal display device according to claim 1.

* * * * *